(12) United States Patent
Leggett, III et al.

(10) Patent No.: US 7,652,951 B2
(45) Date of Patent: *Jan. 26, 2010

(54) METHOD OF GENERATING DIRECTIONAL LOW FREQUENCY ACOUSTIC SIGNALS AND REFLECTED SIGNAL DETECTION ENHANCEMENTS FOR SEISMIC WHILE DRILLING APPLICATIONS

(75) Inventors: James V. Leggett, III, Magnolia, TX (US); Vladimir Dubinsky, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/865,536

(22) Filed: Oct. 1, 2007

(65) Prior Publication Data
US 2008/0130409 A1 Jun. 5, 2008

Related U.S. Application Data

(63) Continuation of application No. 10/640,240, filed on Aug. 13, 2003, now Pat. No. 7,301,852.

(51) Int. Cl.
*G01V 1/40* (2006.01)
(52) U.S. Cl. .................... 367/32; 367/25; 73/152.02; 73/152.05
(58) Field of Classification Search .............. 367/32, 367/25; 73/152.02, 152.05
See application file for complete search history.

(56) References Cited

U.S. PATENT DOCUMENTS

| | | | |
|---|---|---|---|
| 3,979,724 A | 9/1976 | Silverman et al. | 340/15.5 BH |
| 4,951,266 A * | 8/1990 | Hsu | 367/25 |
| 4,993,001 A | 2/1991 | Winbow et al. | 367/144 |
| 5,001,675 A | 3/1991 | Woodward | 367/13 |
| 5,083,124 A | 1/1992 | Nordstrom | 340/853 |
| 5,126,564 A | 6/1992 | Perry et al. | 250/254 |
| 5,134,285 A | 7/1992 | Perry et al. | 250/269 |
| 5,144,126 A | 9/1992 | Perry et al. | 250/254 |
| 5,678,643 A | 10/1997 | Robbins et al. | 175/45 |

(Continued)

*Primary Examiner*—Eric Bolda
*Assistant Examiner*—Ari M Diacou
(74) *Attorney, Agent, or Firm*—Madan & Sriram, P.C.

(57) ABSTRACT

The present invention provides a method and apparatus for using an acoustic logging tool conveyed in a borehole in an earth formation for determining a characteristic of the formation. The method comprises using a first acoustic source for generating an acoustic signal in the earth formation at a first frequency. A second acoustic source spaced apart from the first source is used for generating an acoustic signal in the earth formation at a second frequency different from the first frequency. An acoustic receiver is used for receiving a third acoustic signal indicative of said characteristic. The third acoustic signal has a frequency substantially equal to a difference between the first frequency and the second frequency. The third acoustic signal is produced by a nonlinear interaction between the first signal and the second signal in a portion of said earth formation. It is emphasized that this abstract is provided to comply with the rules requiring an abstract which will allow a searcher or other reader to quickly ascertain the subject matter of the technical disclosure. It is submitted with the understanding that it will not be used to interpret or limit the scope or meaning of the claims.

6 Claims, 4 Drawing Sheets

U.S. PATENT DOCUMENTS

| | | | |
|---|---|---|---|
| 6,023,443 A | 2/2000 | Dubinsky et al. | 367/76 |
| 6,084,826 A | 7/2000 | Leggett, III | 367/82 |
| 6,175,536 B1 | 1/2001 | Khan | 367/32 |
| 6,427,124 B1 | 7/2002 | Dubinsky et al. | 702/9 |
| 6,440,075 B1 | 8/2002 | Averkiou | 600/443 |
| 6,478,107 B1 | 11/2002 | Birchak et al. | 181/113 |
| 7,301,852 B2 * | 11/2007 | Leggett et al. | 367/32 |

* cited by examiner

METHOD OF GENERATING DIRECTIONAL LOW FREQUENCY ACOUSTIC SIGNALS AND REFLECTED SIGNAL DETECTION ENHANCEMENTS FOR SEISMIC WHILE DRILLING APPLICATIONS

CROSS REFERENCE TO RELATED APPLICATIONS

This application is a continuation of co-pending U.S. patent application Ser. No. 10/640,240, filed Aug. 13, 2003.

FIELD OF THE INVENTION

The present invention is related to the field of geophysical exploration and more specifically to a method of using a seismic source to generate and acquire directional signals in a wellbore during drilling operations.

BACKGROUND OF THE INVENTION

Acoustic wave information is used by the oil industry to examine and evaluate the earth's subsurface in the exploration and evaluation of valuable subsurface minerals and mineral reservoirs. Acoustic waves are generated and recorded in oil well logging. This is called sonic or acoustic logging. The sonic wave measurement taken in well boreholes is typically the formation compressional slowness (the reciprocal of velocity). However, other acoustic wave types may measured, for example, shear waves and Stoneley waves.

Prior art downhole acoustic wave (seismic) applications have been used to help oil and gas producers better evaluate their reservoirs and maximize hydrocarbon recovery. A wide range of borehole and cross-well geophysical applications provide data to analyze reservoir properties adjacent to the well bore and ahead of the drill bit for both exploration and field development applications.

For example, downhole sonic tools are used for acquiring walkaway or 3-D vertical seismic profiles (VSPs). Downhole 3-component seismic receivers can be run in combination to simultaneously acquire high-quality 3-component VSP data for detailed structural and stratigraphic reservoir imaging and integration with available surface seismic and well log data.

Conventional borehole seismic services such as velocity surveys and VSPs provide a means to calibrate surface seismic data sets as well as downhole well logs, as well as for images of subsurface geologic structural features. Acquiring Seismic-While-Drilling (SWD) data is a method that uses the drill bit as a downhole energy source to acquire real-time borehole seismic data during the drilling operation without using any special downhole instrumentation. Cross-well seismic imaging techniques are used to evaluate interwell continuity of reservoir units.

3-D Vertical Seismic Profile (3D-VSP) methods may be used to enhance complex reservoir evaluation with conventional 3-D seismic survey data sets. 3D-VSP services provide oil and gas producers with an edge in reservoir characterization. High-resolution 3D-VSP data can be integrated with 3D surface seismic data to provide detailed descriptions of subsurface formation properties and identification of reservoir compartments, not otherwise possible with surface seismic data alone.

Correlating time data and depth data provides detailed structural reservoir models that can help reduce risks and costs in field evaluation and development. Integrating borehole seismic, surface seismic and borehole log data is an important step in constructing an accurate reservoir model. Advanced borehole seismic anisotropy analysis provides for accurate velocity models and improved subsurface imaging. Hydrocarbon reservoirs are buried under an extended overburden consisting of shales and thinly layered sediments, which are often anisotropic. Walkaway VSP surveys are an excellent means to detect subsurface formation anisotropy.

U.S. Pat. No. 6,440,075 to Averkiou discloses an ultrasonic diagnostic imaging system and method for performing nonlinear echo signal imaging with harmonic and intermodulation product (sum or difference frequency) components. Both the harmonic and the intermodulation products are produced by nonlinear effects of tissue or contrast agents and both are advantageously separated from the fundamental transmit components of the echo signals by pulse inversion processing. The use of both types of nonlinear components can improve the signal to noise ratio of the ultrasonic images, and the two types of components can be blended or used in different regions of an image to offset the effects of depth dependent attenuation.

U.S. Pat. No. 3,979,724 to Silverman et al is directed towards a method for determining the position of the drillbit. A Stoneley wave is produced at the surface that propagates through the fluid in the drillstring and produces a seismic signal when it reaches a discontinuity in the fluid path at the drillbit.

Another device used in conjunction with a drillstring is disclosed in U.S. Pat. No. 6,478,107 to Birchak. A compressible fluid is stored in a plurality of chambers within the drill collar. An inlet valve is opened to allow the pressure in a chamber to build up to the pressure of the mud. The inlet valve is then closed and an outlet valve allows the pressurized mud to flow into the annulus between the drill collar and the borehole, thereby generating a pressure wave. This arrangement does not rely on conversion of a Stoneley wave to an acoustic signal.

U.S. Pat. No. 4,993,001 to Winbow discloses a method for the generation of acoustic waves from Stoneley waves for wireline applications. A rotary valve tube wave source is used for producing swept frequency Stoneley waves that are injected into a wellbore. A converter comprising an elongate body that substantially fills the wellbore and has a predetermined shape is positioned at a selected position downhole.

U.S. Pat. No. 6,175,536 to Khan discloses a method for determining a degree of acoustic non-linearity of an earth formation from seismic signals transmitted into the formation from within one wellbore and received from the formation in another wellbore. The seismic signals include two selected discrete frequencies. The method includes spectrally analyzing the received signals, determining from the spectral analysis the presence of a frequency representing a sum of the two selected frequencies, and determining a relative amplitude of the sum frequency with respect to the amplitudes of the two selected discrete frequencies. In a particular embodiment, the method includes determining the presence of a frequency in the spectrally analyzed signals representing the difference between the selected discrete frequencies, and determining the presence of harmonic multiples of one of the two selected discrete frequencies.

There is a need for an efficient method of generating directional sonic wave energy in a wellbore. Low frequency sources can be difficult to direct or target in specific directions relative to a wellbore.

SUMMARY

The present invention provides a method and apparatus for using an acoustic logging tool conveyed in a borehole in an earth formation for determining a characteristic of the formation. The method comprises using a first acoustic source for generating an acoustic signal in the earth formation at a first frequency. A second acoustic source spaced apart from the first source is used for generating an acoustic signal in the earth formation at a second frequency different from the first frequency. An acoustic receiver is used for receiving a third acoustic signal indicative of said characteristic. The third acoustic signal may have a frequency substantially equal to a difference between the first frequency and the second frequency. The third acoustic signal is produced by a nonlinear interaction between the first signal and the second signal in a portion of said earth formation.

The method of the present invention also provides a method and system for using an acoustic logging tool conveyed in a borehole in an earth formation on a bottom hole assembly (BHA) for determining a characteristic of the formation. The BHA includes a conduit for conveying a drilling fluid from a surface location to a drillbit on the bottom hole assembly. The method comprises using a primary acoustic source in the BHA for generating a first acoustic signal in a fluid flow path selected from (i) said conduit, and, (ii) an annulus between said BHA and said earth formation. A secondary acoustic source spaced apart from the primary acoustic source is used for generating an acoustic signal in the earth formation in response to the first signal in the fluid flow path.

BRIEF DESCRIPTION OF THE DRAWINGS

The present invention and its advantages will be better understood by referring to the following detailed description and the attached drawings in which.

While the invention will be described in connection with its preferred embodiments, it will be understood that the invention is not limited thereto. On the contrary, it is intended to cover all alternatives, modifications, and equivalents which may be included within the spirit and scope of the invention, as defined by the appended claims.

DETAILED DESCRIPTION OF THE PREFERRED EMBODIMENTS

The present invention provides a method and system for using an acoustic logging tool conveyed in a borehole in an earth formation for determining a characteristic of the formation. A directional low frequency acoustic beam can be formed to provide for acoustic ranging and formation characteristic detection by using two high frequency sources in a borehole environment. Also, Stoneley waves may be applied as a secondary source of the low frequency acoustic energy at a remote distance from an original source. Embodiments of the invention can include semblance processing for detection and enhancement of the signal of interest.

In general, the present invention provides a method and system for use when drilling boreholes. The drilling system contains a drill string having a downhole subassembly that includes a drill bit at its bottom end and a plurality of sensors and measurement-while-drilling (MWD) devices, including an acoustic MWD system having a first set of acoustic sensors for determining the formation acoustic velocity while drilling the borehole and a second set of acoustic sensors for determining the bed boundaries by utilizing the acoustic velocity measurements made by the first set of acoustic sensors. A downhole computer and associated memory are provided for computing various downhole operating parameters, to determine formation characteristics and parameters, to map the formation around the downhole subassembly, to update stored models and data as a result of the computed parameters and to aid the driller in navigating the drill string along a desired wellbore profile. The computer may have one or more processors for determining acoustic signal characteristics and parameters.

The drilling system may also includes devices for determining the formation resistivity, gamma ray intensity of the formation, the drill string inclination and the drill string azimuth, nuclear porosity of the formation and the formation density. The drill string may contain other MWD devices known in the art for providing information about the subsurface geology, borehole conditions and mud motor operating parameters, such as the differential pressure across the mud motor, torque and the condition of the bearing assembly. Selected data is transmitted between the downhole subassembly and surface computing apparatus via a two-way telemetry system. The surface computing apparatus transmits signals to the downhole subassembly for controlling certain desired operations and also for processing the received data according to programmed instruction to improve the drilling operations.

Figure 1:
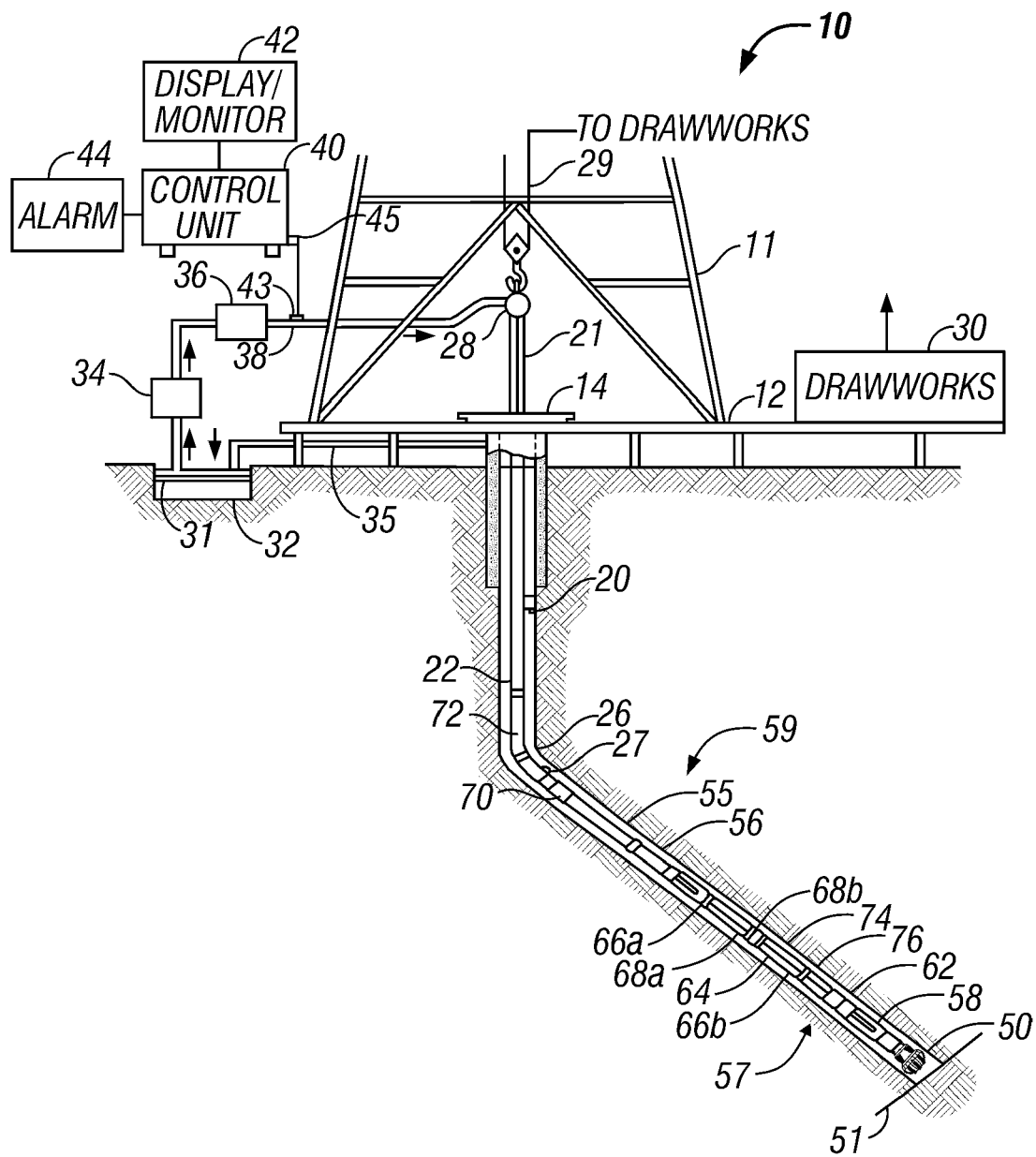
FIG. 1 illustrates a schematic diagram of a drilling system having a drill string that includes an acoustic sensor system according to the present invention.

FIG. 1 shows a schematic diagram of a drilling system 10 having a downhole assembly containing an acoustic sensor system and the surface devices according to one embodiment of present invention. As shown, the system 10 includes a conventional derrick 11 erected on a derrick floor 12 which supports a rotary table 14 that is rotated by a prime mover (not shown) at a desired rotational speed. A drill string 20 that includes a drill pipe section 22 extends downward from the rotary table 14 into a borehole 26. A drill bit 50 attached to the drill string downhole end disintegrates the geological formations when it is rotated. The drill string 20 is coupled to a drawworks 30 via a kelly joint 21, swivel and line 29 through a system of pulleys 28. During the drilling operations, the drawworks 30 is operated to control the weight on bit and the rate of penetration of the drill string 20 into the borehole 26. The operation of the drawworks is well known in the art and is thus not described in detail herein.

During drilling operations a suitable drilling fluid (commonly referred to in the art as "mud") 31 from a mud pit 32 is circulated under pressure through the drill string 20 by a mud pump 34. The drilling fluid 31 passes from the mud pump 34 into the drill string 20 via a desurger 36, fluid line 38 and the kelly joint 21. The drilling fluid is discharged at the borehole bottom 51 through an opening in the drill bit 50. The drilling fluid circulates uphole through the annular space 27 between the drill string 20 and the borehole 26 and is discharged into the mud pit 32 via a return line 35. Preferably, a variety of sensors (not shown) are appropriately deployed on the surface according to known methods in the art to provide information about various drilling-related parameters, such as fluid flow rate, weight on bit, hook load, etc.

A surface control unit 40 receives signals from the downhole sensors and devices via a sensor 43 placed in the fluid line 38 and processes such signals according to programmed instructions provided to the surface control unit. The surface control unit displays desired drilling parameters and other information on a display/monitor 42, which information is utilized by an operator to control the drilling operations. The surface control unit 40 contains a computer, memory for storing data, data recorder and other peripherals. The surface control unit 40 also includes models and processes data according to programmed instructions and responds to user commands entered through a suitable means, such as a keyboard. The control unit 40 is preferably adapted to activate alarms 44 when certain unsafe or undesirable operating conditions occur.

A drill motor or mud motor 55 coupled to the drill bit 50 via a drive shaft (not shown) disposed in a bearing assembly 57 rotates the drill bit 50 when the drilling fluid 31 is passed through the mud motor 55 under pressure. The bearing assembly 57 supports the radial and axial forces of the drill bit, the downthrust of the drill motor and the reactive upward loading from the applied weight on bit. A stabilizer 58 coupled to the bearing assembly 57 acts as a centralizer for the lowermost portion of the mud motor assembly.

In the preferred embodiment of the system of present invention, the downhole subassembly 59 (also referred to as the bottomhole assembly or "BHA") which contains the various sensors and MWD devices to provide information about the formation and downhole drilling parameters and the mud motor, is coupled between the drill bit 50 and the drill pipe 22. The downhole assembly 59 preferably is modular in construction, in that the various devices are interconnected sections so that the individual sections may be replaced when desired.

Still referring back to FIG. 1, the BHA also preferably contains sensors and devices in addition to the above-described sensors. Such devices include a device for measuring the formation resistivity near and/or in front of the drill bit, a gamma ray device for measuring the formation gamma ray intensity and devices for determining the inclination and azimuth of the drill string. The formation resistivity measuring device 64 is preferably coupled above the lower kick-off subassembly 62 that provides signals, from which resistivity of the formation near or in front of the drill bit 50 is determined. One resistivity measuring device is described in U.S. Pat. No. 5,001,675, which is assigned to the assignee hereof and is incorporated herein by reference. This patent describes a dual propagation resistivity device ("DPR") having one or more pairs of transmitting antennae 66a and 66b spaced from one or more pairs of receiving antennae 68a and 68b. Magnetic dipoles are employed which operate in the medium frequency and lower high frequency spectrum. In operation, the transmitted electromagnetic waves are perturbed as they propagate through the formation surrounding the resistivity device 64. The receiving antennae 68a and 68b detect the perturbed waves. Formation resistivity is derived from the phase and amplitude of the detected signals. The detected signals are processed by a downhole circuit that is preferably placed in a housing 70 above the mud motor 55 and transmitted to the surface control unit 40 using a suitable telemetry system 72.

The inclinometer 74 and gamma ray device 76 are suitably placed along the resistivity measuring device 64 for respectively determining the inclination of the portion of the drill string near the drill bit 50 and the formation gamma ray intensity. Any suitable inclinometer and gamma ray device, however, may be utilized for the purposes of this invention. In addition, an azimuth device (not shown), such as a magnetometer or a gyroscopic device, may be utilized to determine the drill string azimuth. Such devices are known in the art and are, thus, not described in detail herein. In the above-described configuration, the mud motor 55 transfers power to the drill bit 50 via one or more hollow shafts that run through the resistivity measuring device 64. The hollow shaft enables the drilling fluid to pass from the mud motor 55 to the drill bit 50. In an alternate embodiment of the drill string 20, the mud motor 55 may be coupled below resistivity measuring device 64 or at any other suitable place.

The downhole assembly of the present invention preferably includes a MWD section 78 which contains a nuclear formation porosity measuring device, a nuclear density device and an acoustic sensor system placed above the mud motor 64 in the housing 78 for providing information useful for evaluating and testing subsurface formations along borehole 26. The preferred configurations of the acoustic sensor system are described later with reference to FIGS. 3A and 3B. The present invention may utilize any of the known formation density devices. U.S. Pat. No. 5,134,285, which is assigned to the assignee hereof and which is incorporated herein by reference, discloses a formation density device that employs a gamma ray source and a detector which may be utilized in the system of the present invention. In use, gamma rays emitted from the source enter the formation where they interact with the formation and attenuate. The attenuation of the gamma rays is measured by a suitable detector from which density of the formation is determined.

The porosity measurement device preferably is the device generally disclosed in U.S. Pat. No. 5,144,126, which is assigned to the assignee hereof and which is incorporated herein by reference. This device employs a neutron emission source and a detector for measuring the resulting gamma rays. In use, high energy neutrons are emitted into the surrounding formation. A suitable detector measures the neutron energy delay due to interaction with hydrogen and atoms present in the formation. Other examples of nuclear logging devices are disclosed in U.S. Pat. Nos. 5,126,564 and 5,083,124.

The above-noted devices transmit data to the downhole telemetry system 72, which in turn transmits the received data uphole to the surface control unit 40. The downhole telemetry also receives signals and data from the uphole control unit 40 and transmits such received signals and data to the appropriate downhole devices. The present invention preferably utilizes a mud pulse telemetry technique to communicate data from downhole sensors and devices during drilling operations. A transducer 43 placed in the mud supply line 38 detects the mud pulses responsive to the data transmitted by the downhole telemetry 72. Transducer 43 generates electrical signals in response to the mud pressure variations and transmits such signals via a conductor 45 to the surface control unit 40. Other telemetry techniques such electromagnetic and acoustic techniques or any other suitable technique may be utilized for the purposes of this invention.

Figure 2:
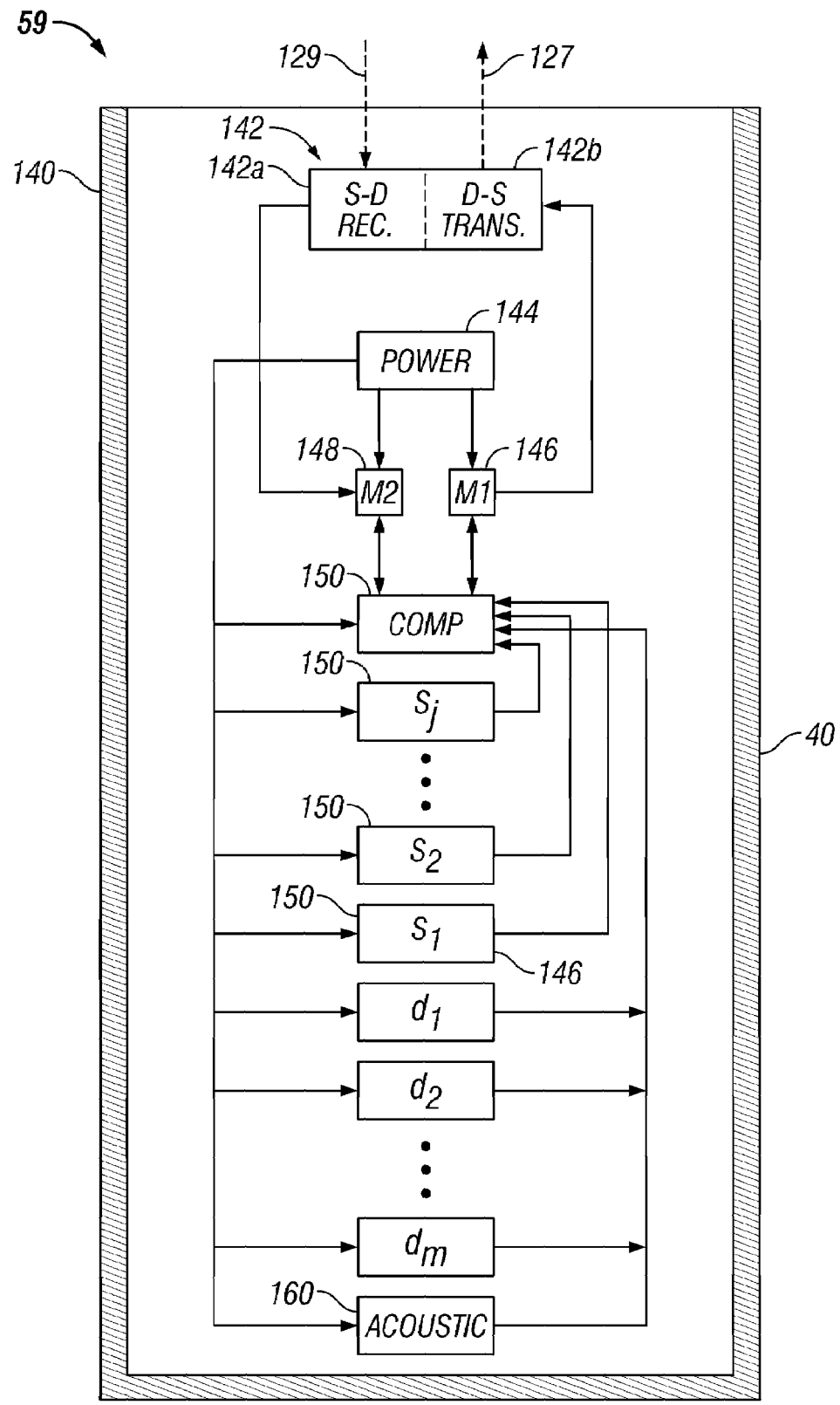
FIG. 2 illustrates a functional block diagram of the major downhole elements of the system shown in FIG. 1.

FIG. 2 shows a functional block diagram of the major elements of the downhole subassembly 59 and further illustrates the data communication paths between the various system elements. It should be noted that FIG. 2 illustrates only one arrangement of the elements and a system of data communication therebetween. Other arrangements may be utilized equally effectively for the purpose of this invention. For convenience, the sensors for determining the downhole operating conditions and the downhole assembly health are denoted by $S_1$-$S_j$, the acoustic sensor system is denoted by numeral 160 while the remaining downhole MWD devices, such as the nuclear, electromagnetic, directional and the like, are denoted by $d_1$-$d_m$. The sensors $S_1$-$S_j$, MWD devices $d_1$-$d_m$, and the desired acoustic sensor system 160 are arranged within the downhole subassembly in a desired manner. During operation, a predetermined number of discrete data points output from the sensors and MWD devices are stored within a buffer which, in FIG. 2, is included as a partitioned portion of the memory capacity of the computer 150. Alternatively, the buffer storage can comprise a separate element (not shown).

Sensor response relationships or "models" for the acoustic sensor system and other sensors in the downhole subassembly are preferably stored in a memory 148. These models are determined mathematically and/or by measuring responses of the sensors in a known test formations. In addition, other reference data such as data defining the targeted formations to be drilled, seismic data, offset well data is preferably stored downhole in the memory 148. A two-way data and command signal communications are provided between the computer 150 and the memory 148. The responses from the sensors $S_1$-$S_j$, $d_1$-$d_m$ and 160 are transmitted to the computer 150 wherein they are transformed into parameters of interest or answers as described later. The downhole electronics for processing signals downhole and to perform other computations includes the computer or controller 150, memory 145 and 146, and other desired components, such as signals processors, amplifiers, etc. (not shown). For simplicity, the use of such components is known in the art and are thus, not included in FIG. 2. The use of these components is further disclosed in U.S. Pat. Nos. 6,427,124 and 6,023,443 to Dubinsky et al (Assignee: Baker Hughes), which patents are fully incorporated by reference.

Still referring to FIG. 2, the parameters of interest are transmitted to the surface via the up-link telemetry path 127 or stored in the memory 146 for subsequent retrieval at the surface. Since the acoustic sensor system 160 and other sensors 152 and $d_1$-$d_m$ are placed axially along the downhole subassembly, their responses do not correspond to the same measure point within the borehole 26 (see FIG. 1). Prior to combining or correlating the data from different sensors, the computer 150 shifts the data to a common depth point. Also, the various devices $d_1$-$d_m$ do not necessarily exhibit the same vertical resolution. Therefore, vertical resolution matching is performed by the computer 150 before combining or correlating measurements from different sensors.

Once computed from the depth-shifted and resolution-matched data, the parameters of interest are then passed to the downhole portion of the telemetry system 142 and subsequently telemetered to the surface by a suitable up-link telemetry means illustrated conceptually by the broken line 127. The power source 144 supplies power to the telemetry element 142, computer 150, memories 146 and 148 and associated control circuits (not shown). Information from the surface is transmitted over the downlink telemetry path illustrated conceptually by the broken arrow 129 to the downhole receiving element of the downhole telemetry unit 142, and then transmitted to the data storage unit 148 for subsequent use.

A preferred embodiment of the present invention provides a method of using an acoustic logging tool conveyed in a borehole in an earth formation for determining a characteristic of the formation. The method comprises using a first acoustic source for generating an acoustic signal in the earth formation at a first frequency. The first acoustic source may be a high frequency (HF) transmitter array. A second acoustic source, which also may be a HF transmitter array, is spaced apart from the first source and is used for generating an acoustic signal in the earth formation at a second frequency different from the first frequency. An acoustic receiver is used for receiving a third acoustic signal (a resultant of the first and second source) indicative of the formation characteristic. The third acoustic signal has a frequency substantially equal to a difference between the first frequency and the second frequency. The third acoustic signal is produced by a nonlinear interaction between the first signal and the second signal in a portion of said earth formation.

The present invention provides for forming a directional low frequency acoustic beam for acoustic ranging, formation attribute determination or other seismic-while-drilling applications by using two high frequency sources in borehole environment. One of the problems in the field of seismic data acquisition while drilling is forming a focused directional signal at a relatively low frequency (LF) in the direction of interest. LF is considered as 1 kHz and below. There is a significant disadvantage in using a low frequency source as a primary source of the acoustic energy since the source has to have a relatively large aperture to provide appropriate directivity to be effectively used for SWD applications.

Figure 3A:
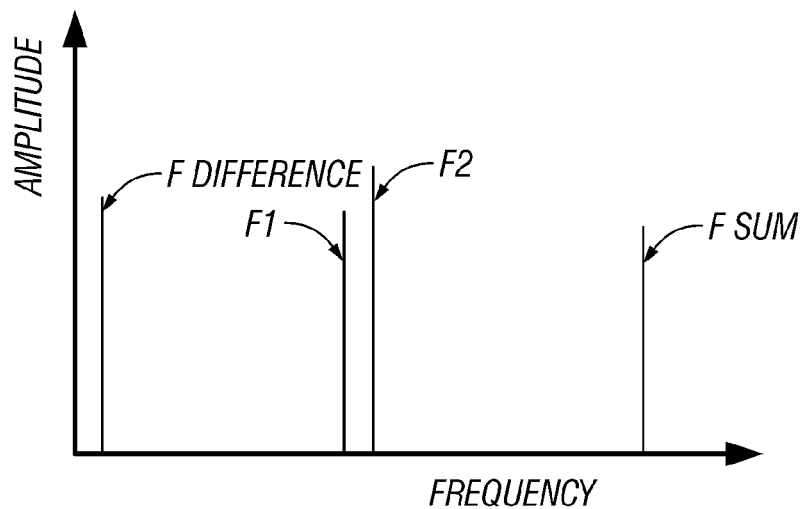
FIG. 3A illustrates frequency spectra for two frequencies and their sum and difference frequencies.

The method and system of the present invention provides for the use of two (or more, possibly arrayed) high frequency (HF) sources to form a low frequency beam in the direction of interest. Due to the natural non-linear effects in the formation, the combination of these signals will produce a low frequency signal at both the differential low frequencies and summation frequencies, which are high. For example, if the frequencies for two HF sources are 70 kHz and 71 kHz respectively, the result of non-linear interaction will produce signals at 1 kHz (a useful LF component) and at 141 kHz (a less useful HF component, which will quickly dissipate in the formation due to the natural acoustic energy loss). FIG. 3A schematically illustrates frequency spectra for two frequencies f1, f2 along with their sum (F sum=||f1+f2||) and difference (F difference=||f1−f2||) frequencies. In addition to the difference frequencies, other nonlinear resonances related to the difference frequencies may also be generated. Applying an amplitude or frequency modulation to comprise a variable frequency acoustic driver (e.g. using a chirp signal with one or both sources) to the original HF signals may enhance the natural non-linearly of the rock and increase the information acquired. One advantage of using two HF sources is that it is easier to focus acoustic energy toward a particular direction by using a high frequency source (with a range of dozens of kHz). Central frequencies of these sources are selected based on the expected depth of penetration for the primary HF signals, as the difference of these frequencies should be equal to a desired low frequency of the resulting signal, which then is used for acoustic ranging or other SWD applications.

Figure 3B:
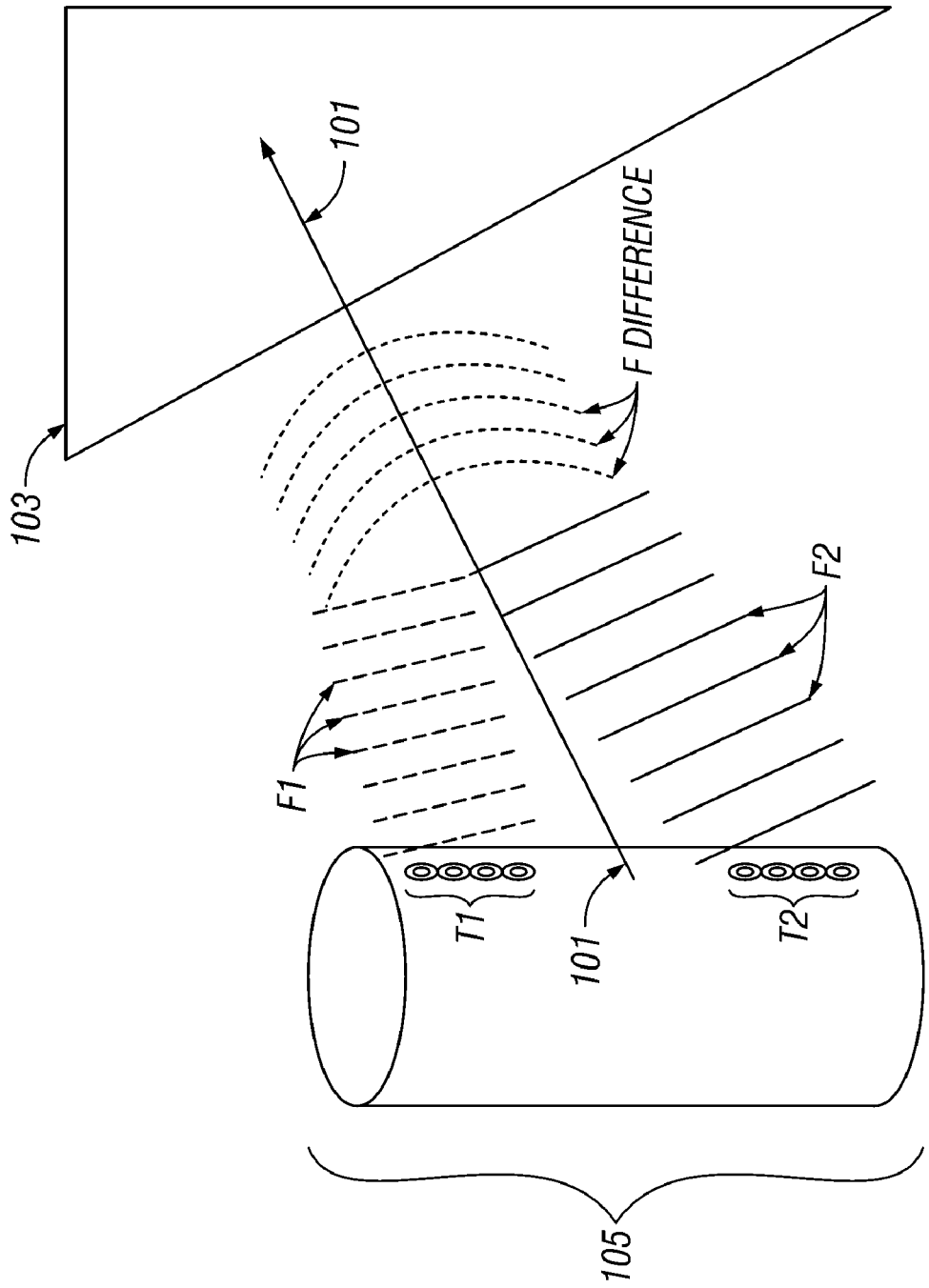
FIG. 3B illustrates an embodiment of the present invention forming a directional low frequency acoustic beam directed toward an acoustic boundary.

The direction of the acoustic beam for each of the two sources is selected in such a way that the beams intersect each other at a certain distance from the borehole. FIG. 3B illustrates an embodiment of the present invention forming a directional low frequency acoustic beam directed into a formation adjacent a borehole or toward an acoustic boundary 103. Located on a section of a BHA 105 or other suitable position on a drill string, a first acoustic source or signal generator, T1, emits a first acoustic signal, f1 into earth formation adjacent to a borehole. A second acoustic source or signal generator, T2, emits a second acoustic signal, f2 into earth formation adjacent to a borehole. The resulting low frequency acoustic energy signal F difference will penetrate the formation in the direction of the mean line 101 between directions of the two HF signals, a first frequency f1 and a second frequency f2. An acoustic receiver (not shown) is used to receive the third frequency F difference that is produced by a nonlinear interaction between the first signal f1 and second signal f2 in the earth formation.

There are several patents on the use of acoustic transmitters and receivers on a MWD device for providing information about the position and orientation bed boundaries in proximity to the drillbit. See, for example, U.S. Pat. Nos. 6,084,826 to Leggett (Assignee: Baker Hughes Incorporated) and 5,678,643 to Robbins (Assignee: Halliburton). These disclose the use of high frequency acoustic signals for determination of formation acoustic velocities. The high frequency signals used for velocity determination do not have much depth of penetration into the subsurface formations. In contrast, the present invention provides for low frequency signals that suffer less absorption that can be used for determining the location and orientation of bed boundaries.

As mentioned above, a major problem with generating low frequency signals is that the source has to have a relatively large aperture to provide an appropriate directionality to be used for seismic while drilling applications. When both the source and the receiver are at substantially the same position on the bottom hole assembly, it may be difficult to get imaging information in certain directions.

In another preferred embodiment the method and system of the present invention can use a secondary source spaced apart and separate from a primary source location for addressing the geometry problem. The secondary source is an acoustic energy propagation path discontinuity. The primary source produces an acoustic signal within the drill collar (or in the annulus between the drill collar and the earth formation). A Stoneley wave is produced within the drill collar (or within the annulus between the drill collar and the earth formation) and propagates away from the source with relatively little attenuation. Whenever there is a discontinuity in the propagation path (e.g., hole size variation, formation change, obstruction inside the drill collar), part of the Stoneley wave gets reflected and part of it radiates into the formation as an acoustic wave. This radiated energy is a secondary source emitted into the earth formation that can provide the proper geometry for imaging of bed boundaries.

The present invention provides for several types of controllable propagation path discontinuities. One type of discontinuity is the bottom of the hole, which both reflects and radiates acoustic energy. Other controllable propagation path discontinuities may also be used such as a constriction within the drill collar produced by a diaphragm, or vanes on the outside of the drill collar to introduce a constriction in the annulus. For obvious reasons, neither type of constriction can be permanent because a permanent constriction would interfere with the flow of drilling mud or production operations.

The present invention provides for application of the Stoneley wave as a secondary source of low frequency acoustic energy at a remote distance from the original source (for SWD applications). Stoneley waves seismic waves that generally are propagated along an interface. Stoneley waves are always possible at solid-fluid interfaces and under restricted conditions at solid-solid interfaces. Stoneley waves are surfaces in a borehole and are sensitive to formation permeability. The Stoneley wave (or more commonly used generic term "tube wave") is generally considered in seismic applications as a detrimental guided wave within the borehole, which interferes with the signals of interest. As provided for in this application, some features of the Stoneley wave are advantageously used for SWD applications. The following features of the Stoneley wave are utilized for SWD: 1) It is a guided, low frequency wave (in the range around 1 kHz), which propagates along the borehole over large distances with low losses; 2) Every obstacle on the propagation path (e.g., hole size variation, formation change, or other abrupt geometrical or property changes along the borehole) causes a tube wave reflection, or other energy partition, to occur within the borehole. Portions of the acoustic energy are radiated into the formation at those locations and, therefore, can be used to look "out" into the rock to detect features. 3) The signature and the frequency of the Stoneley wave are controllable by the original acoustic source and/or measurable at points where energy is partitioned or redirected.

These features allow partial redirection of the acoustic energy to radiate energy remotely at distances separate from the originating source by using various mechanisms to control effective annulus area (e.g., a controlled diaphragm, vane or other discontinuity). A natural strong obstacle for the Stoneley wave is the bottom of the hole; therefore significant acoustic energy will be radiated into the formation surrounding the bottom of the wellbore. This can be utilized for "look ahead" SWD applications.

Statistical distribution of the reflected signal's coherence values (i.e., a histogram of the coherence values) may be used for detection and enhancement of the signal of interest. Even when an array of receivers distributed along a borehole is utilized to detect a low magnitude reflected acoustic signal (e.g., a reflection from an acoustic boundary in the formation), it may still be a challenge to be able to properly detect and/or identify the reflection. There are two major issues associated with this: (1) a very poor signal-to-noise ratio for the signal of interest and (2) presence of a many other reflections of different nature within the borehole, which will interfere with the signal of interest.

Although there are several techniques used for wave separation in conventional seismic data processing, the method of the present invention approaches the problem from a different angle. Basically, all the signals acquired by the receiver array are classified based on the distribution curve of the coherence values produced by array processing (e.g., semblance processing or other signal coherency analysis like cross-correlation or eigenvector analysis). It has been observed that reflections of different natures within a population of reflector events are characterized by different average values of coherence. Therefore, when all coherence values are plotted on a histogram chart (horizontal axis-coherence values and vertical axis-frequency of appearance of these values), one can observe distinct populations of signals differentially grouped around different coherence value maxima.

Figure 4:
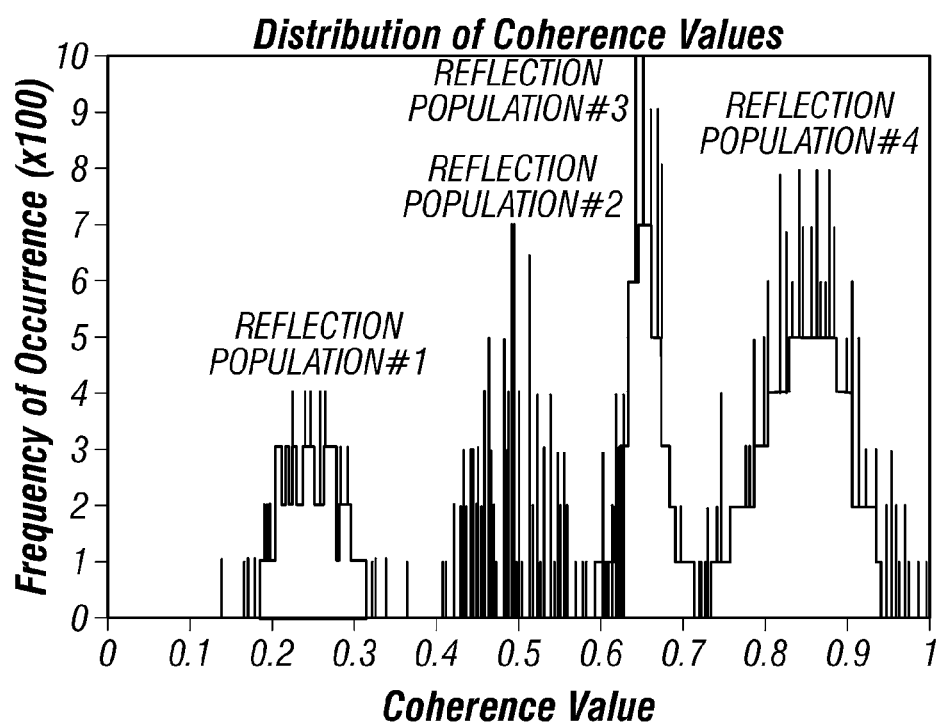
FIG. 4 illustrates use of statistical distribution of the reflected signal's coherence values for detection, enhancement and discrimination of the signal of interest.

FIG. 4 illustrates use of statistical distribution of the reflected signal's coherence values for detection and enhancement of the signal of interest, and discrimination among different reflector types for borehole acoustic data. In this example, the signals with low coherence values (usually below 0.3, for example Reflection Population #1) mainly represent reflections from an acoustic boundary in the formation. Signals with higher coherence values (greater than 0.3-0.4, or, for example Reflection Population #2) represent various reflections within the borehole.

By sorting the signals based on these various criteria, the weak reflections of interest can be identified. Reflections from lithological boundaries inside formations adjacent to the borehole 'behave' differently, that is, have different statistical distribution characteristics when compared with events emanating from acoustic boundaries within a borehole. These different characteristics may be Adding a third dimension to the histogram (e.g., an arrival time) and presenting the distribution plot as a 3D graph enhances the signal detection discrimination. Alternatively, the data may be windowed in time to determine and enhance the types and locations of acoustic events, and this can be based on apriori knowledge of formation boundaries and geometries. The method and system of the present invention provides for a processor for determining semblance and further discrimination of formation boundaries and lithologies. Further material on acoustic energy discrimination is disclosed in U.S. Pat. Nos. 6,427,124 and 6,023,443 to Dubinsky et al (Assignee: Baker Hughes), which patents have been fully incorporated by reference.

The implementation of the present invention may be carried out in many different ways. Other implementations and embodiments will be apparent to those versed in the art without departing from the true scope of the invention. Further, it should be understood that the invention is not to be unduly limited to the foregoing which has been set forth for illustrative purposes. Various modifications and alternatives will be apparent to those skilled in the art without departing from the true scope of the invention as defined in the following claims.

What is claimed is:

1. A method of using an acoustic logging tool conveyed in a borehole in an earth formation for determining a location of an interface of the formation, the method comprising:
    (a) generating a first directed acoustic signal in a direction away from the borehole at a first frequency; and
    (b) generating a second directed acoustic signal in the earth formation at a second frequency different from the first frequency, the second signal intersecting the first signal at a specified distance from the borehole;
    (c) producing a signal resulting from interaction of the first and second signals, the produced signal having a frequency substantially equal to a difference of the first frequency and the second frequency;
    (d) determining a location of the interface of the earth formation using the produced signal; and
    (e) recording the location of an interface on a suitable medium.

2. The method of claim 1 wherein the directed acoustic signals comprise a compressional wave.

3. The method of claim 1 wherein at least one of said first acoustic signal and said second acoustic signal further comprises a variable frequency acoustic signal.

4. An acoustic system for determining a location of an interface of an earth, the system comprising:
    (a) an acoustic tool configured to:
        (A) generate a first directed acoustic signal in a direction away from the borehole at a first frequency, and
        (B) generate a second directed acoustic signal in the earth formation at a second frequency different from the first frequency, the second signal intersecting the first signal at a specified distance from the borehole, interaction of the first and second signals producing a third signal having a frequency substantially equal to a difference of the first frequency and the second frequency; and
    (b) a processor configured to:
        (A) determine the a location of an interface of the earth formation using the third signal; and
        (B) record the location of an interface on a suitable medium.

5. The system of claim 4 wherein the directed acoustic signals comprise a compressional wave.

6. The system of claim 4 wherein at least one of said first acoustic signal and said second acoustic signal further comprises a variable frequency acoustic signal.

* * * * *